US012704468B2

(12) United States Patent
Sato et al.

(10) Patent No.: US 12,704,468 B2
(45) Date of Patent: Aug. 11, 2026

(54) CONTROL APPARATUS, SYSTEM, METHOD AND PROGRAM

(71) Applicant: Rigaku Corporation, Tokyo (JP)

(72) Inventors: Takashi Sato, Tokyo (JP); Takashi Matsumoto, Tokyo (JP); Tomokazu Hasegawa, Tokyo (JP)

(73) Assignee: RIGAKU CORPORATION, Tokyo (JP)

( * ) Notice: Subject to any disclaimer, the term of this patent is extended or adjusted under 35 U.S.C. 154(b) by 152 days.

(21) Appl. No.: 18/846,766

(22) PCT Filed: Feb. 21, 2023

(86) PCT No.: PCT/JP2023/006168
§ 371 (c)(1),
(2) Date: Sep. 13, 2024

(87) PCT Pub. No.: WO2023/176330
PCT Pub. Date: Sep. 21, 2023

(65) Prior Publication Data

US 2025/0198953 A1 Jun. 19, 2025

(30) Foreign Application Priority Data

Mar. 14, 2022 (JP) ................................ 2022-039104

(51) Int. Cl.
*G01N 23/00* (2006.01)
*G01N 23/20008* (2018.01)

(52) U.S. Cl.
CPC .............................. *G01N 23/20008* (2013.01)

(58) Field of Classification Search
CPC ....... G01N 2223/054; G01N 2223/637; G01N 23/20008; G01N 23/201
See application file for complete search history.

(56) References Cited

U.S. PATENT DOCUMENTS

2014/0093043 A1* 4/2014 Nakatsugawa .......... A61B 6/58 378/62
2020/0088516 A1 3/2020 Hagihara
2020/0256811 A1 8/2020 Thorne

FOREIGN PATENT DOCUMENTS

JP 2019056587 A * 4/2019

OTHER PUBLICATIONS

JP2019-56587A: English Translation Description (Year: 2019).*
(Continued)

*Primary Examiner* — Dani Fox
(74) *Attorney, Agent, or Firm* — XSENSUS LLP

(57) ABSTRACT

A control apparatus, system, method, and program are provided that can efficiently acquire data significant for specifying the structure of a macromolecule in solution with a resolution greater than 30 Å. A control apparatus for controlling an X-ray analysis apparatus comprises a data converting section for converting sample solution data and reference solution data acquired from an X-ray analysis apparatus into profiles at each time, a first index calculating section for calculating a first index representing fluctuation in intensity calculated from a relationship between time and the intensity based on at least a profile of solution data of the converted profiles, a first index determining section for determining whether or not the calculated first index is within a predetermined range, and an apparatus controlling section for terminating measurement by the X-ray analysis apparatus when the first index is not within the predetermined range.

14 Claims, 14 Drawing Sheets

(56) References Cited

OTHER PUBLICATIONS

International Search Report and Written Opinion mailed on May 16, 2023, received for International Application No. PCT/JP2023/006168, filed on Feb. 21, 2023, 09 pages including English Translation.
Sachiko Toma-Fukai, "Recent Topic of Structural Study of Macromolecular Assembly by Using Bio-SAXS", Journal of the Crystallographic Society of Japan, vol. 61, No. 2, 2019, 6 pages including English Translation.
Extended European search report issued on Feb. 9, 2026, in corresponding European patent Application No. 23770289.9, 8 pages.
Japanese Office Action issued Jul. 7, 2026 in corresponding Japanese Patent Application No. 2024-507643, 9 pages.

* cited by examiner

| q | INTENSITY (I) | STANDARD DEVIATION (σ) | ・・・ |
|---|---|---|---|
| | | | |
| | | | |
| | | | |
| | | | |

FIG. 9

CONTROL APPARATUS, SYSTEM, METHOD AND PROGRAM

CROSS-REFERENCE TO RELATED APPLICATIONS

This application is a national stage application, filed under 35 U.S.C. § 371, of International Patent Application No. PCT/JP2023/006168, filed Feb. 21, 2023, which claims the priority to Japanese Patent Application No. 2022-039104, filed Mar. 14, 2022, the entire contents of each are incorporated herein by reference.

FIELD

The present disclosure relates to a control apparatus, system, method, and program for controlling a measurement apparatus that detects a scattered image by irradiating macromolecules in solution with X-rays.

BACKGROUND

Description of the Related Art

X-ray solution scattering method (Bio-SAXS) is known as a method for observing a biomacromolecule in a solution (Non-Patent Document 1). According to Bio-SAXS, it is possible to analyze a scattered image acquired by entering an X-ray or a neutron beam into a sample solution, and to determine the molecular shape of the biomacromolecule in the solution. In this method, crystallization and freezing of the sample are unnecessary as in single crystal structure analysis and Cryogenic electron microscopy, and the structure of the sample in the solution can be observed as it is. Bio-SAXS is often used to identify the arrangement of subunits in relatively large molecular complexes and structural changes due to ligand binding.

Non-Patent Documents

Non-Patent Document 1: Sachiko Toma, "Recent Topic of Structural Study of Macromolecular Assembly by Using Bio-SAXS", Crystallographic Society of Japan, 61, 2 (2019), 79-80

SUMMARY

However, the resolution of Bio-SAXS as described in Non-Patent Document 1 is limited to the extent to which the molecular shape of the biomacromolecule can be specified. FIG. 14 is a diagram showing a correspondence relationship between an attainable resolution and a scattering profile. As shown in FIG. 14, the precision of the structure that can be specified by Bio-SAXS is limited to about 30 Å in resolution.

On the other hand, in the field of biopharmaceuticals, for example, specification of a structural of 30 Å or less in a molecule, a molecular complex, or the like may be required. As one of the quality controls, the integrity test of a joint of protein forming a designed virus particle is carried out. In such structure analysis, a MAXS (Middle Angle X-ray Scattering) for analyzing a scattered intensity profile on high angle range is used. Since the intensity of the scattered intensity profile on the high angle range is small, it takes time to store significant data. However, the biomacromolecule tends to degrade, and thus the quality of the data deteriorates when the measurement is performed for a long time.

The present disclosure has been made in view of such circumstances, and an object thereof is to provide a control apparatus, a system, a method, and a program capable of efficiently acquiring data significant for specifying a structure of a macromolecule in a solution with a resolution of higher than 30 Å.

(1) For example, the control apparatus of the present disclosure is a control apparatus for controlling an X-ray analysis apparatus, comprising a data converting section for converting sample solution data and reference solution data acquired from an X-ray analysis apparatus into profiles at each time, a first index calculating section for calculating a first index representing fluctuation in intensity calculated from a relationship between time and the intensity based on at least a profile of solution data of the converted profiles, a first index determining section for determining whether or not the calculated first index is within a predetermined range, and an apparatus controlling section for terminating measurement by the X-ray analysis apparatus when the first index is not within the predetermined range.

(2) Further, in the control apparatus of the present disclosure, the first index calculating section calculates the first index with respect to a differential profile between a profile of the sample solution and a profile of the reference solution.

(3) Further, in the control apparatus of the present disclosure, the first index calculating section calculates the first index with respect to a profile of the reference solution.

(4) Further, the control apparatus of the present disclosure further comprises a second index calculating section for calculating a second index indicating a ratio of the intensity data to the fluctuation of the intensity in the scattering angle direction based on an integrated profile of at least a solution data obtained from the converted profiles, and a second index determining section for determining whether or not the calculated second index tends to increase, wherein the apparatus controlling section terminates the measurement by the X-ray analysis apparatus when the calculated second index does not tend to increase.

(5) Further, in the control apparatus of the present disclosure, the second index calculating section calculates the second index with respect to a differential profile between a profile of the sample solution and a profile of the reference solution.

(6) Further, in the control apparatus of the present disclosure, the second index determining section determines whether or not the calculated second index is a threshold value or larger, and the apparatus controlling section terminates the measurement by the X-ray analysis apparatus when the calculated second index is the threshold value or larger.

(7) Further, the control apparatus of the present disclosure further comprises a measurement time determining section for determining whether or not the measurement time is over a predetermined value, wherein the apparatus controlling section terminates the measurement by the X-ray analysis apparatus when the measurement time is over the predetermined value.

(8) Further, the control apparatus of the present disclosure further comprises an analysis data generating section for adjusting the scale so that the average values of the sample solution data and the reference solution data coincide with each other before the subtraction in the range of the wide angle side of the scattering vector.

(9) Further, the control apparatus of the present disclosure further comprises an I/O controlling section for outputting a plot of the calculated first index with respect to time to an output device during measurement.

(10) Further, the control apparatus of the present disclosure further comprises an I/O controlling section for outputting a plot of the calculated second index with respect to time to an output device during measurement.

(11) Further, the system of the present disclosure is a system for performing X-ray analysis, comprises an X-ray analysis apparatus for irradiating a sample with X-rays and detecting a scattered image, and the control apparatus according to any one of the above (1) to (10) for controlling the X-ray analysis apparatus.

(12) Further, the method of the present disclosure is a method for controlling an X-ray analysis apparatus, comprising the steps of converting sample solution data and reference solution data acquired from an X-ray analysis apparatus into profiles at each time, calculating a first index representing fluctuation in intensity calculated from a relationship between time and the intensity based on at least a profile of solution data of the converted profiles, determining whether or not the calculated first index is within a predetermined range, and terminating measurement by the X-ray analysis apparatus when the first index is not within the predetermined range.

(13) Further, the program of the present disclosure is a program for controlling an X-ray analysis apparatus, causing a computer to execute the processes of converting sample solution data and reference solution data acquired from an X-ray analysis apparatus into profiles at each time, calculating a first index representing fluctuation in intensity calculated from a relationship between time and the intensity based on at least a profile of solution data of the converted profiles, determining whether or not the calculated first index is within a predetermined range, and terminating measurement by the X-ray analysis apparatus when the first index is not within the predetermined range.

BRIEF DESCRIPTION OF THE DRAWINGS

FIG. 9 is a table of extracted parameters.

DETAILED DESCRIPTION

Figure 1:
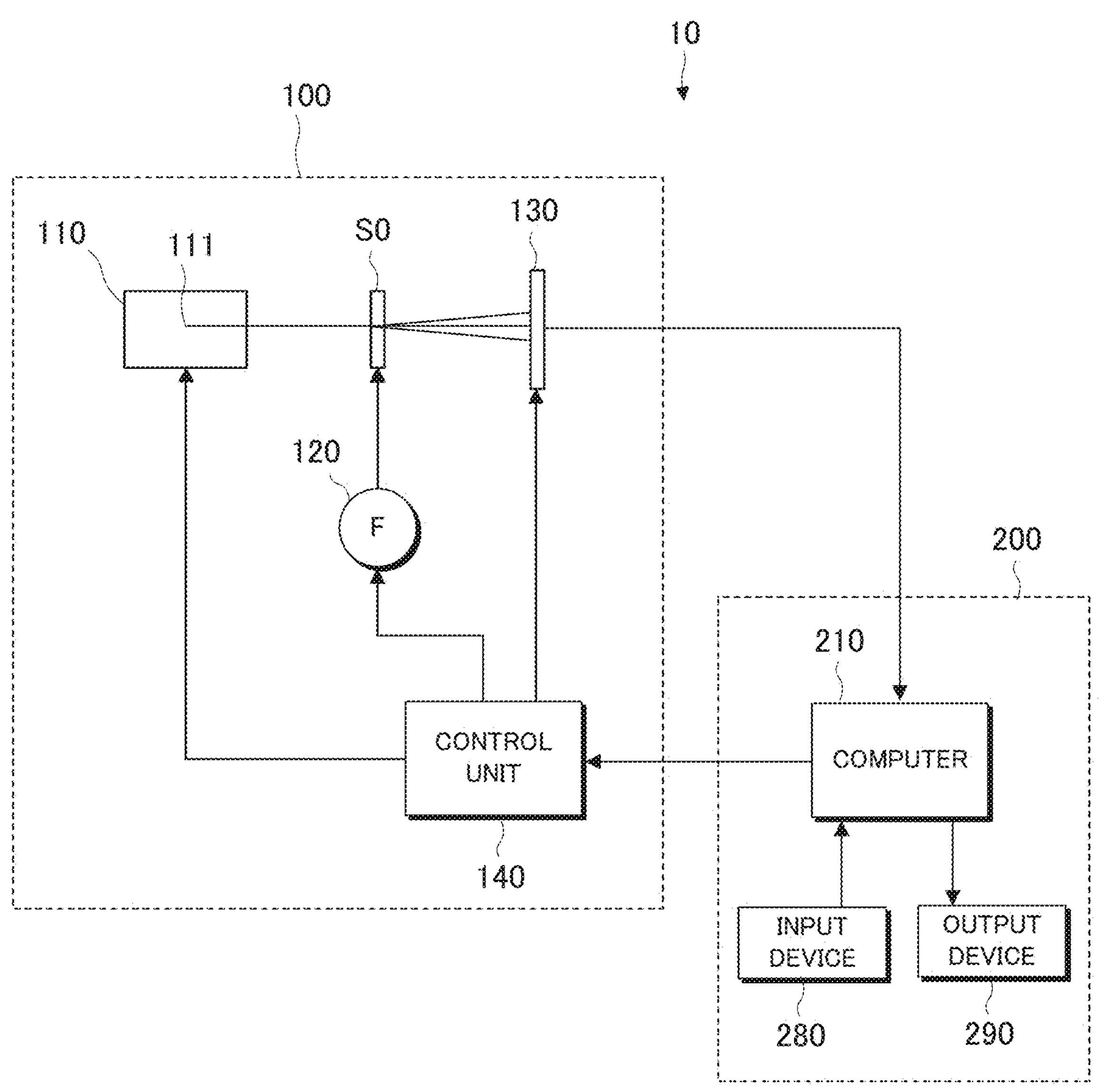
FIG. 1 is a schematic diagram showing a control system according to the present disclosure.

Next, embodiments of the present disclosure are described with reference to the drawings. To facilitate understanding of the description, the same reference numerals are assigned to the same components in the respective drawings, and duplicate descriptions are omitted.

[Situation Peculiar to X-Ray Field]

In the field of X-rays, the process of reading developed and fixed films with scanners has been followed for many years. Therefore, the time span of measurement including not only diffraction but also imaging is large, and the accumulated detection data is not evaluated in real time. Under such handling, even if there is an abnormality during measurement, the abnormality cannot be noticed until the measurement or analysis is completed, and therefore, samples collected for many months before sufficient data is obtained may be damaged.

The idea of setting a certain quality required for measurement and exposing for the quality in a field where the idea of recognizing measurement as a bet is dominant has a large paradigm shift. In particular, in the scattering, although the measurement of the solution biomacromolecule is inevitably damaged by X-ray irradiation, there is a situation in which excessive exposure times must be set, because the scattering intensity is small, and it is usually difficult to obtain an adequate S/N. There is a great meaning in that the sample, which has used for the present scattering, can be also subjected to other biological experiments by evaluating the measurement result in real time to determine the continuation of the measurement according to circumstances, or to terminate the measurement at the minimum necessary as in the present disclosure.

[Principle]

In order to specify the structure of a macromolecule in solution by MAXS with a resolution of about 10 Å (q=0.63A−1), it is necessary to collect the measured data of the reference solution and the sample solution efficiently and calculate the data for analysis. In the present disclosure, while scattered images of the reference solution and the sample solution are acquired as measurement data, it is simultaneously determined whether or not the measurement should be continued based on the measurement data in parallel. At this time, it is checked whether sufficient measurement data is expected to be acquired for the analysis in the state, and whether sufficient measurement data has been acquired for the analysis. Significant data can be efficiently acquired by such two-step determination. Hereinafter, a configuration and an operation for realizing the embodiment are described in detail.

First Embodiment

[Control System]

FIG. 1 is a schematic diagram showing a control system 10. The control system 10 comprises an X-ray analysis apparatus 100 and a control apparatus 200. The X-ray analysis apparatus 100 irradiates the sample S0 with X-rays and detects small-angle scattered X-rays. The sample S0 can be a macromolecule, in particular a biomacromolecule, in solution. In particular, it is useful when the sample S0 is a pharmaceutical molecule, a molecular complex, or a structure in solution requiring structure analysis with 30 Å or less.

Objective solutions include a sample solution and a reference solution. The sample solution is a solution containing a sample, and is, for example, a solution containing a biomacromolecule and a special component for holding the biomacromolecule. The reference solution is a solution obtained by removing the sample from the sample solution. For example, the reference solution of the above example is a solution that does not contain a biomacromolecule but contains a special component. As the reference solution, a solution consisted of a component similar to the component of the sample solution may be separately prepared, but it is possible to use a solution obtained by separating the sample from the sample solution.

The control apparatus 200 comprises a computer 210, an input device 280, and an output device 290 and controls the operation of the X-ray analysis apparatus 100 and acquires measurement data from the X-ray analysis apparatus 100 and processes it.

The X-ray analysis apparatus 100 comprises an X-ray generating section 110, a sample loading mechanism 120, a detector 130, and a control unit 140. The X-ray generating section 110 has an X-ray source 111 and irradiates the sample S0 with X-rays. For the target of the X-ray source 111, Cu can be used, although Co may be used. The sample loading mechanism 120 delivers the sample solution containing the sample or the reference solution without the sample to the X-ray irradiation position with the sample holding tube. The detector 130 detects X-rays scattered by the sample S0 and transmits the acquired measured data to the computer 210.

In the above-described configuration, one detector 130 is provided for one X-ray beam emitted from the X-ray source 111, but other configurations may be adopted. For example, the X-ray analysis apparatus 100 may be configured to irradiate two equivalent beams in the same direction using a mirror or a slit and detect the scattered rays by one detector. In addition, the X-ray analysis apparatus 100 may be configured to irradiate two equivalent beams in opposite directions and detect the scattered rays by two detectors.

The computer 210 is, for example, a PC, and comprises a processor that executes processes, a memory that stores programs and data, a hard disk, and the like. The computer 210 receives user input from an input device 280 such as a keyboard or a mouse.

The computer 210 may be a server device placed on a cloud. In addition, from the viewpoint of processing load, the function for controlling the operation of the X-ray analysis apparatus 100 and the function for processing the measured data may be separated, and the control may be executed by a PC placed at the site, and the data processing may be executed by the server device.

[X-Ray Analysis Apparatus]

Figure 2:
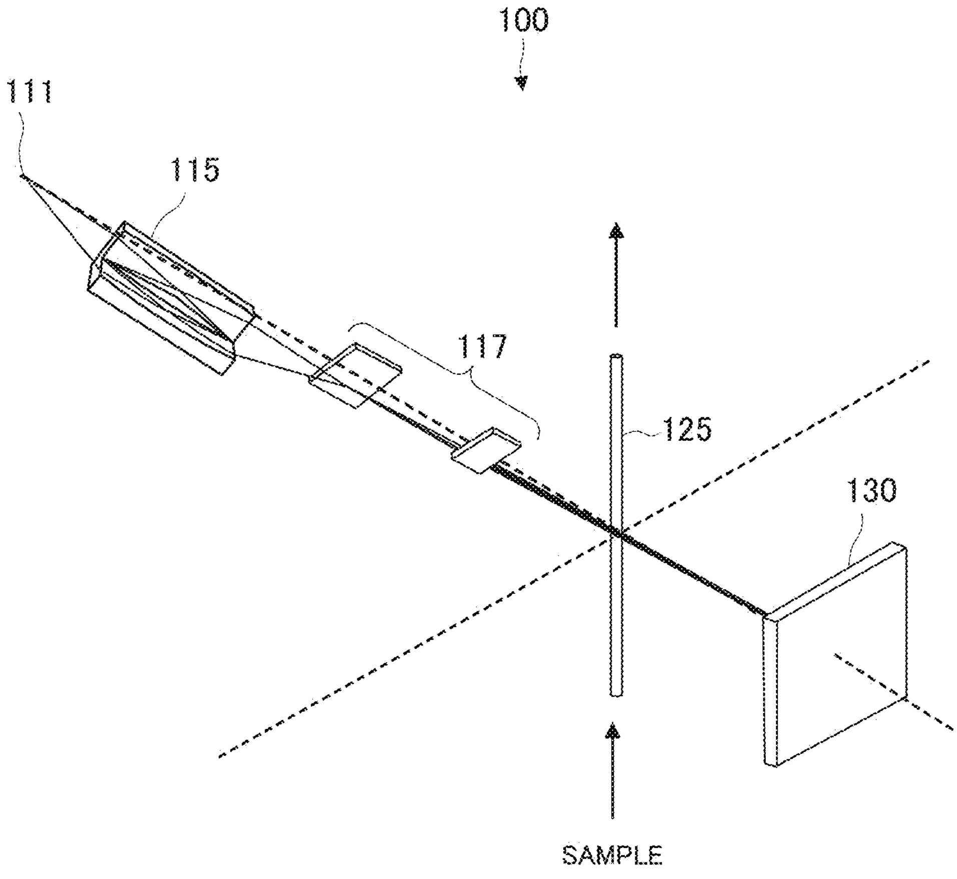
FIG. 2 is a perspective view showing an X-ray analysis apparatus according to the present disclosure.

FIG. 2 is a perspective view showing the X-ray analysis apparatus 100. The X-ray analysis apparatus 100 comprises an X-ray source 111, an optical system 115, a Kratzky block 117, a sample holding tube 125, and a detector 130. The X-ray source 111 is a line radiation source or a point radiation source and emits a divergent beam. The optical system 115 is, for example, a KB parallel-type or series-type optical system.

A pair of Kratzky blocks 117 interact with the x-rays by their respective edges to define one side and the other side of the x-ray beam. Thus, parasitic scattering can be removed from the irradiated X-rays. The sample holding tube 125 delivers and holds 5 μl to 10 μl of the solution.

The detector 130 detects X-rays scattered by the solution. The X-ray analysis apparatus 100 transmits the detected scattered image to the control apparatus 200. The scattered image detected at every predetermined time t is transmitted as measurement data.

[Control Apparatus]

Figure 3:
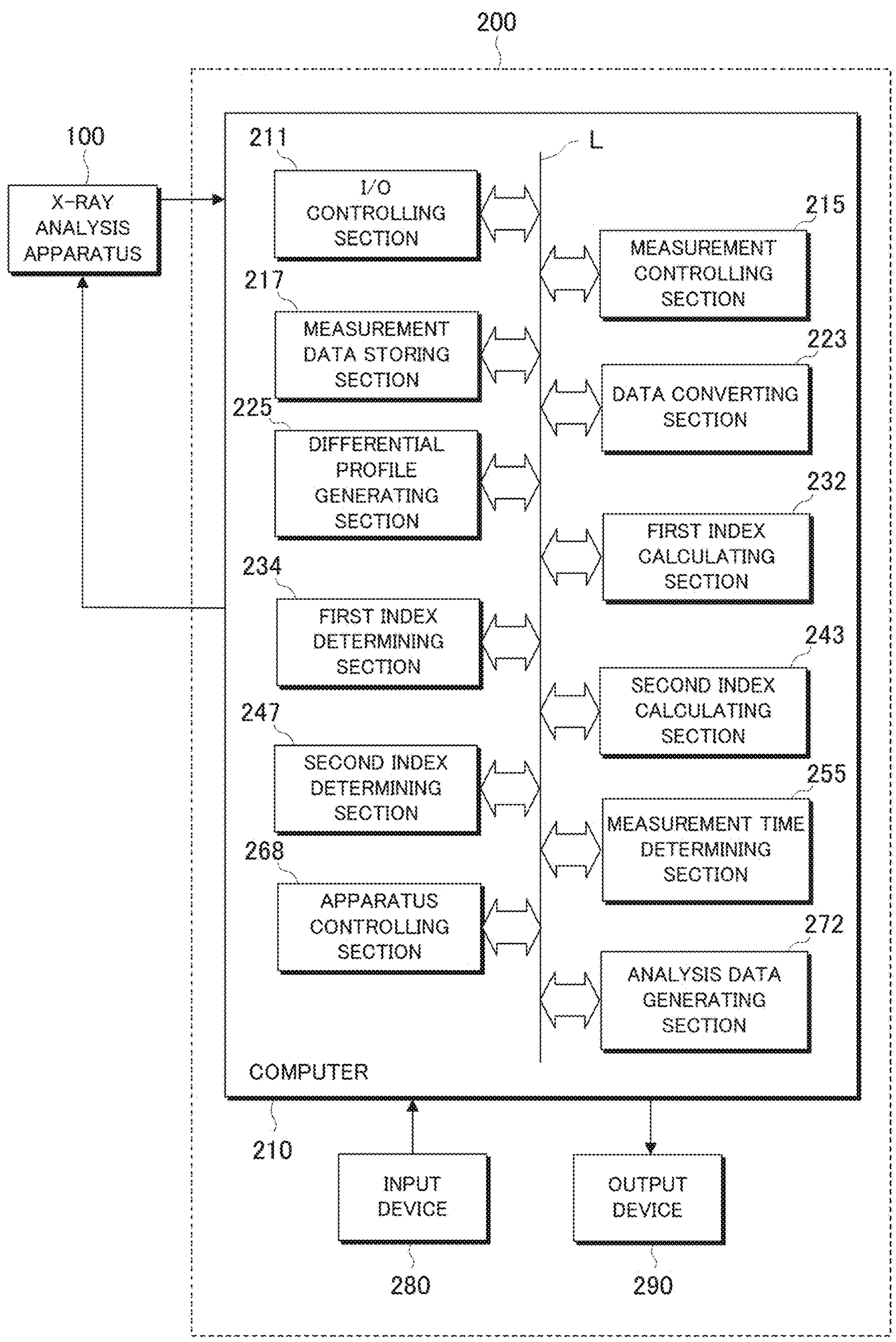
FIG. 3 is a block diagram showing the configuration of the control system.

FIG. 3 is a block diagram showing the control system of the present disclosure. The control apparatus 200 controls the X-ray analysis apparatus 100 to acquire a scattered image. The functions of the control apparatus 200 are mainly realized by the computer 210.

The computer 210 comprises an I/O controlling section 211, a measurement controlling section 215, a measurement data storing section 217, a data converting section 223, a differential profile generating section 225, a first index calculating section 232, a first index determining section 234, a second index calculating section 243, a second index determining section 247, a measurement time determining section 255, an apparatus controlling section 268, and an analysis data generating section 272. Each section can transmit and receive information via the control bus L.

The I/O controlling section 211 receives an input from the input device 280 and controls an output to the output device 290. The I/O controlling section 211 can receive an input of a measurement condition, for example. Examples of the measurement conditions include the intensity of the generated X-ray, the position of the Kratzky block, the blank position to which the X-ray is irradiated, the position of the solution, the arrangement of the detector, and the measurement time t at the time of acquiring the scattered image. Further, the I/O controlling section 211 can output the transition of each index and the determination result.

Figure 10:
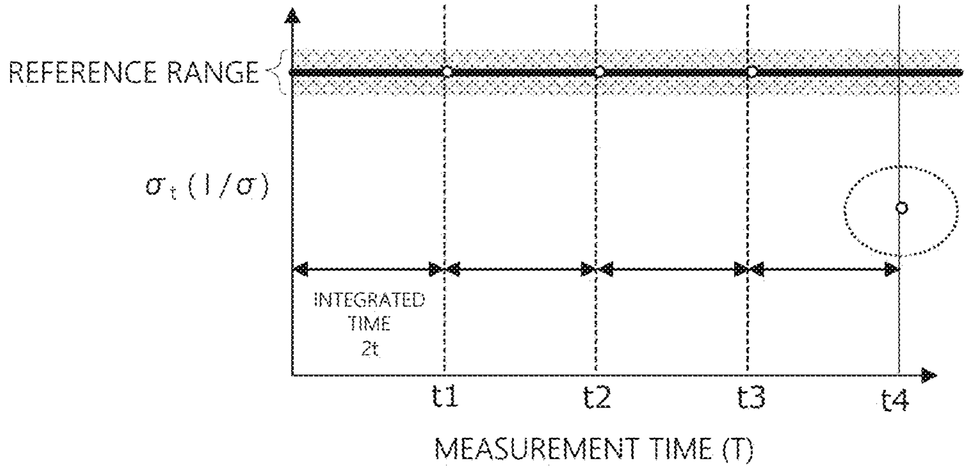
FIG. 10 is a graph showing a transition example of $\sigma t(I/\sigma)$.
Figure 11:
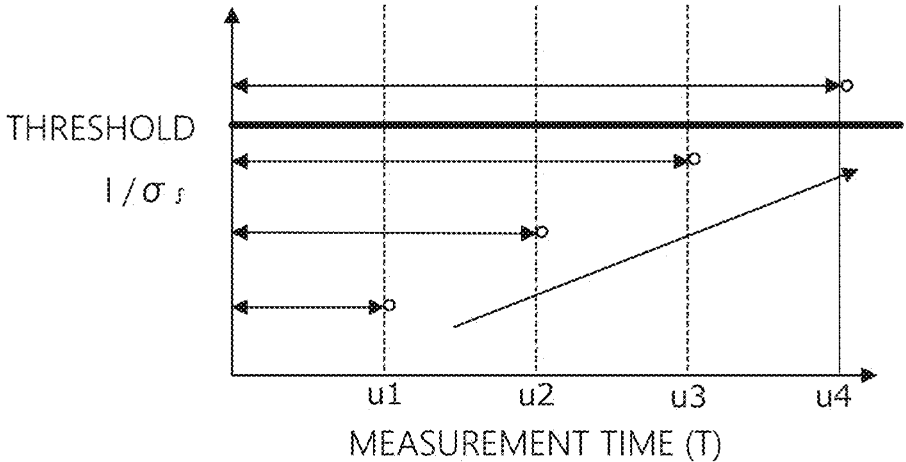
FIG. 11 is a graph showing a transition example of $I/\sigma$.

For example, a plot of the calculated first index with respect to the measurement time may be output to the output device during the measurement, or a plot of the calculated second index with respect to the measurement time may be output to the output device during the measurement. Specifically, for example, a graph as shown in FIG. 10 or FIG. 11 described later is displayed on the display. In this way, the user can confirm, with the display, information related to the termination of the measurement during the measurement.

The measurement controlling section 215 controls the operation of the X-ray analysis apparatus 100. Controlled operation includes for sample delivery, X-ray generation, and sample position and detector movement. The control instruction is transmitted to the control unit 140 in the X-ray analysis apparatus 100, and thus each unit of the X-ray analysis apparatus 100 is controlled.

The measurement data storing section 217 stores the scattered images detected by the X-ray analysis apparatus 100 as measurement data. The stored measurement data is used for conversion to a scattering profile, generation of analysis data, and the like.

The data converting section 223 converts the measurement data into a scattering profile. Specifically, the intensity is integrated along the circumferential direction (B direction) around the center of the scattered image, and the scattering profile is calculated. Thus, the data converting section 223 converts the sample solution data and the reference solution data acquired from the X-ray analysis apparatus into profiles at each time. The data converting section 223 also calculates the standard deviation of the intensity in the β direction with respect to the constant wave number q.

The differential profile generating section 225 generates a differential profile between the sample solution data and the reference solution data at each time. Specifically, a differential profile is generated by subtracting the scattering profile of the reference solution from the scattering profile of the sample solution based on the consecutive measurement data of the reference solution and the sample solution.

The first index calculating section 232 calculates a first index representing the fluctuation of the intensity over the time axis direction based on at least one of the solution profiles of the converted profiles. That is, the calculation is performed based on at least one of the solution data comprising the reference solution data and the sample solution data. For example, the first index can be calculated for the differential profile between the profile of the sample solution data and the profile of the reference solution. The accuracy of the difference depends on the accuracy of each subtracted object, and therefore cannot be estimated easily. It is efficient to calculate a determination index using a differential profile required for the analysis.

The first index is, for example, $\sigma t(I/\sigma)$. The calculation process of $\sigma t(I/\sigma)$ is described later in detail. Alternatively, the first index may be a radius of gyration Rg, a scatter intensity at the origin I(0), or the like. When a Guinier plot is calculated for the objective profile, I(0) can be calculated from the intercept and Rg can be calculated from the slope. For calculating the first index, it is possible to use a profile in wide angle corresponding to a MAXS region to be described later. As a result, it can be confirmed that there is no abnormality in the measurement and data that can be used for the analysis has been secured.

The first index determining section 234 determines whether or not the calculated first index is within a predetermined range. As a result, it can be confirmed that there is no change that makes it impossible to continue the measurement such as damage of the sample. For example, when a sample is damaged, the sample may form a cluster generated with gathered molecules. At this time, since the intensity of the X-ray due to the solution scattering near the origin depends on the molecular weight, the scattering intensity of the aggregate becomes larger and I/o becomes larger. If there is such a change, termination of the measurement allows for an efficient measurement. The predetermined range can be empirically determined, for example, from accumulated data for the sample solution of interest. For example, when the first index is Rg, change of Rg by 1 indicates a significant change of the size, therefore a range in which the change in Rg is ±0.5 or less can be set to a predetermined range.

The second index calculating section 243 calculates a second index representing a ratio of the intensity data to the fluctuation of the intensity in the scattering angle direction based on at least one of the profiles of the solution data obtained from the converted profiles. The second index can be calculated using a differential profile or a profile of the sample solution data. The second index is, for example, $I/\sigma$. The calculation steps of $I/\sigma$ are described later in detail.

The second index determining section 247 determines whether or not the calculated second index has an increasing trend. Thus, it is possible to confirm whether or not the second index corresponding to S/N ratio tends to be increased. The determination as to whether or not there is an increasing trend can be performed, for example, by determining whether or not the second index calculated for each generation of the differential profile (for each time 2t) is larger than the second index calculated last time. The time interval for contrasting may be 4t with taking into account errors. For example, when the second index is $I/\sigma$, whether the second index tends to be increasing or not can be determined based on whether the value in MAXS region of the first differential profile tends to be increasing or not. As the MAXS area, an area where q is 0.5 $Å^{-1}$ or more and 0.6 $Å^{-1}$ or less can be set. If there is no increasing trend, S/N ratio is not improved even if the measurement is repeated any more, and therefore, the measurement is terminated and efficient measurement is enabled.

The second index determining section 247 determines whether or not the calculated second index is the threshold value or larger. As a result, it is possible to confirm that S/N ratio is improved to the extent that the object can be achieved, and thus, it is possible to perform efficient measurement.

The measurement time determining section 255 determines whether or not the measurement time is over a predetermined value. Thus, when the measurement time is too long, the measurement can be efficiently performed by terminating the measurement.

The apparatus controlling section 268 starts measurement according to a start instruction. Specifically, it controls to operate the X-ray analysis apparatus 100 to irradiate the solution with X-rays and detect scattered X-rays by the detector 130 to transmit scattered images. In addition, it changes the solution irradiated with X-rays alternately between the reference solution and the sample solution every predetermined time. In addition, the apparatus controlling section 268 performs a terminating process of the measurement by the X-ray analysis apparatus when the first index is not in the predetermined range, the second index is not in the increasing trend, the second index is the threshold value or larger, or the measurement time is over the predetermined value.

The analysis data generating section 272 adjusts the scale so that the average values of the sample solution data and the reference solution data coincide with each other before the subtraction in the range on the wide angle side of the scattering angle. Thus, it is possible to generate accurate analysis data even in a wide angle range.

[Control Method]

Figure 4:
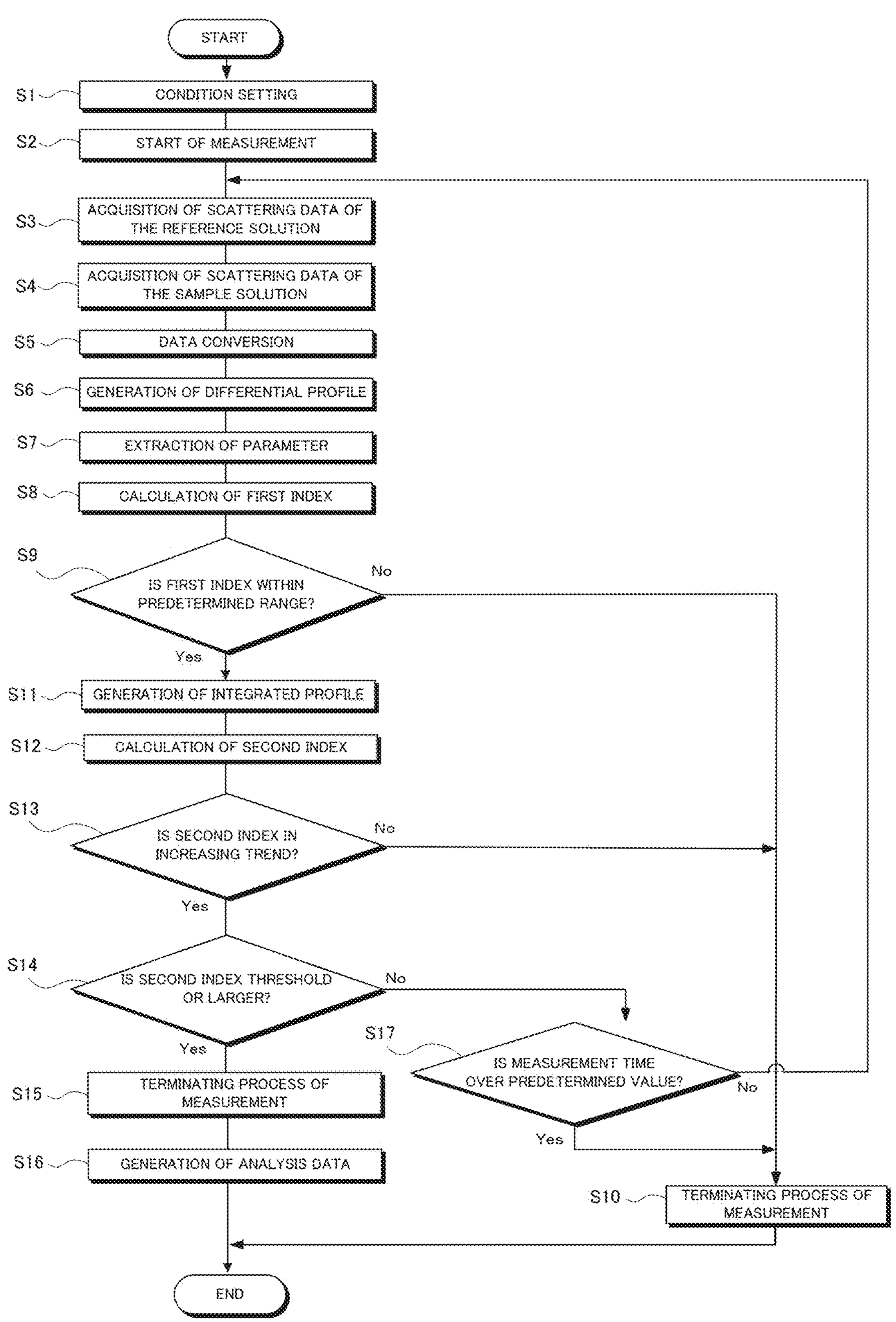
FIG. 4 is a flowchart showing the operation of the control apparatus of the first embodiment.

A method of controlling the X-ray analysis apparatus using the control system 10 configured as described above is described. However, acquisition of the scattered image, calculation of the index, and the like are described later in details. FIG. 4 is a flowchart showing an operation of the control apparatus 200. First, the X-ray analysis apparatus 100 sets the measurement conditions based on the information input from the user (step S1).

In response to the instruction to start the measurement by the user input, the X-ray analysis apparatus 100 starts the measurement (step S2). The X-ray analysis apparatus 100 delivers the reference solution to a predetermined position, irradiates the reference solution with X-rays, and acquires scattered data by the detector (step S3). Next, the scattering data of the sample solution is acquired in the same manner (step S4). The scattering data is treated as the measurement data in a unit of the scattered image data for every predetermined time t. The X-ray analysis apparatus transmits the acquired scattered image data as the measurement data to the computer 210.

The computer 210 stores the received measurement data and converts the measurement data into the scattering profiles (step S5). The data conversion is described in detail below. The scattering profile of the reference solution is from the acquired subtracted scattering profile of the sample solution, and the differential profile is generated (step S6). In the generation of the differential profile, the difference of the measurement data is generated in a unit of every predetermined time t.

The computer 210 extracts parameters such as the wave number q, the intensity I and the standard deviation σ of the intensity based on the obtained differential profile (step S7). Then, σt(I/σ) is calculated as the first index representing the fluctuation of the intensity in the time axis direction (step S8). It is determined whether or not the calculated first index is within the predetermined range (step S9), and when the first index is not within the predetermined range, a process of terminating the measuring is performed (step S10). It should be noted that the measurement time can be divided at predetermined time intervals and can be represented by tm=t1, t2, t3 . . . as described later.

On the other hand, when the first index is within the predetermined range, an integrated profile is generated (step S11). The integrated profile is data obtained by integrating the differential profiles from the start of measurement to the present time. I/σ is calculated as the second index representing the ratio of the intensity to the fluctuation of the intensity in the scattering angle direction using the obtained integrated profile (step S12). It is determined whether or not the second index is in an increasing trend (step S13), and if the second index is not in an increasing trend, the process proceeds to step S10, and a process terminating the measurement is performed.

If the second index is in an increasing trend, it is determined whether or not the second index is the threshold or larger (step S14). When the second index is the threshold value or larger, a process terminating the measurement is performed (step S15), and analysis data is generated (step S16).

If the second index is not the threshold value or larger, it is determined whether or not the measurement time is over a predetermined value (step S17). If the measurement time is not over the predetermined value, the process returns to the step S3, and the measurement is continued. When the measurement time is over the predetermined value, the process proceeds to the step S10, and the process terminating the measurement is performed. Each process is described below in detail.

(Acquire of Scattered Images)

Figure 5:
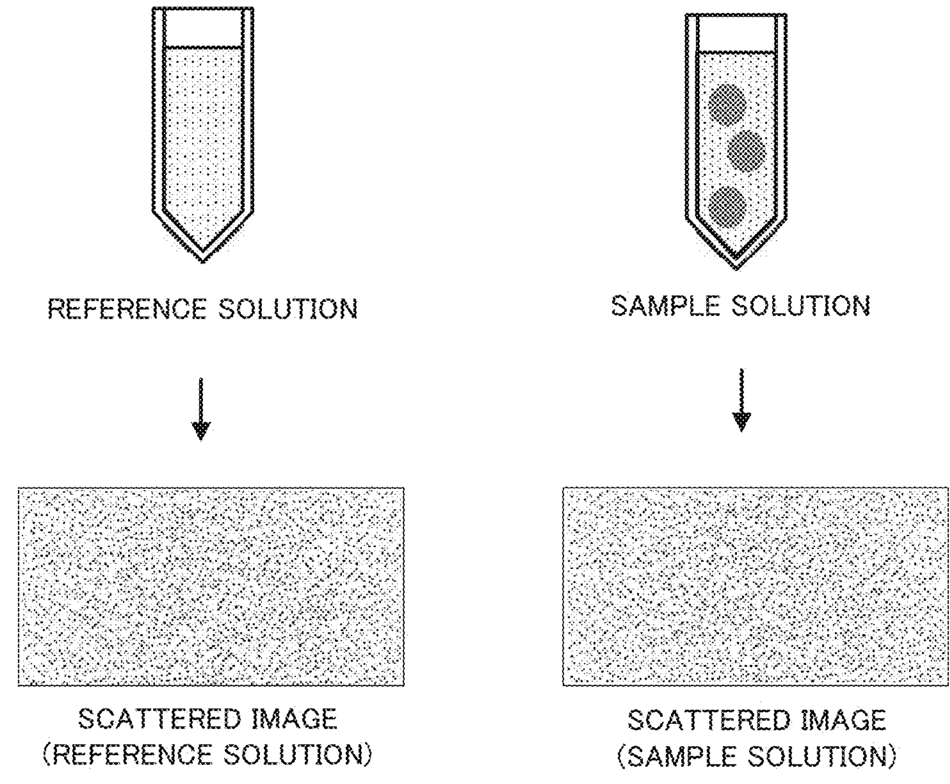
FIG. 5 is a schematic diagram showing processes until scattered images are acquired.

FIG. 5 is a schematic diagram showing processes until scattered images are acquired. The reference solution and the sample solution are alternately irradiated with X-rays, and a scattered image detected at every predetermined time t is acquired. By replacing the sample holding tube 125 using the sample loading mechanism, it is possible to alternately irradiate each solution.

(Data Conversion)

Figure 6A:
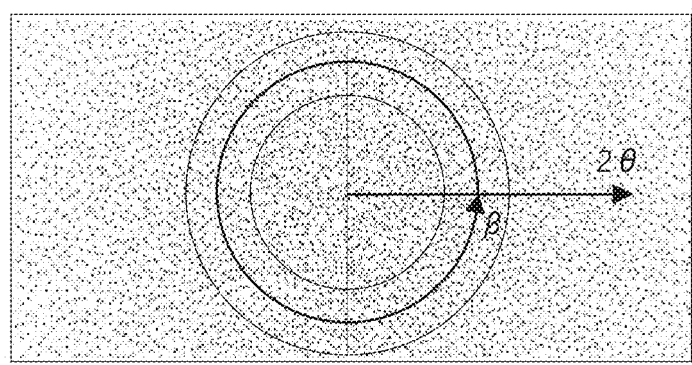
FIG. 6A, FIG. 6B, and FIG. 6C are respectively a scattered image, a β-direction profile and a q-direction profile.
Figure 6B:
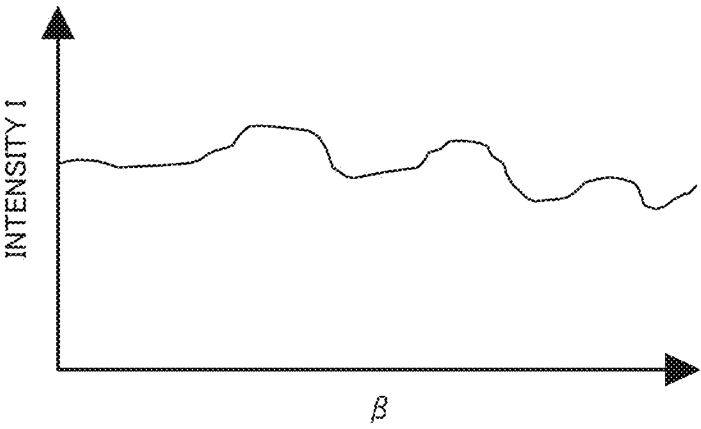
Figure 6C:
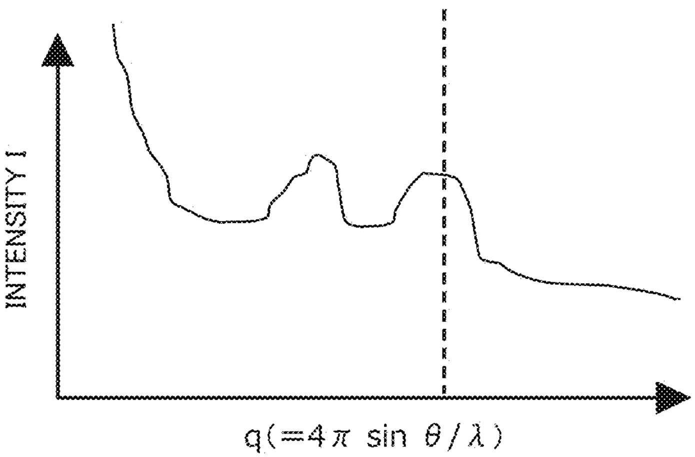

FIGS. 6A to 6C are respectively a scattered image, a β-direction profile and a q-direction profile. When the solution is irradiated with X-rays, a scattered image as shown in FIG. 6A is acquired. When the intensity I is plotted in the circumferential direction (β direction) around the center at a predetermined wave number q in the scattered image, a graph as shown in FIG. 6B is obtained. When the intensity I is integrated in the β direction of the scattered image and the integrated intensity I is represented for each wave number q, a scattering profile as shown in FIG. 6C is obtained.

(Generating Differential Profile)

Figure 7A:
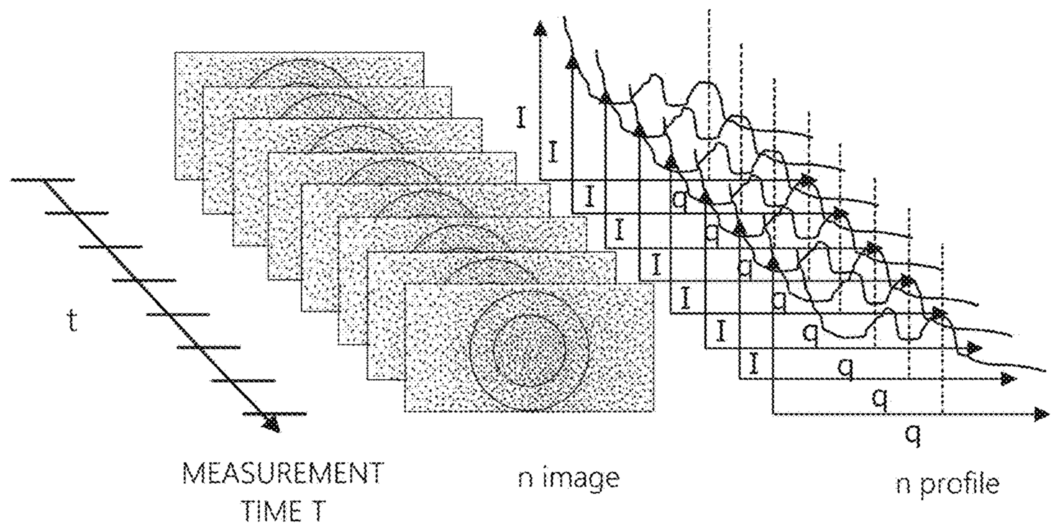
FIG. 7A, FIG. 7B, and FIG. 7C are diagrams showing a q-direction profile for each acquisition of a scattered image, acquisition of the measurement data at each time, and generation of a differential profile.
Figure 7B:
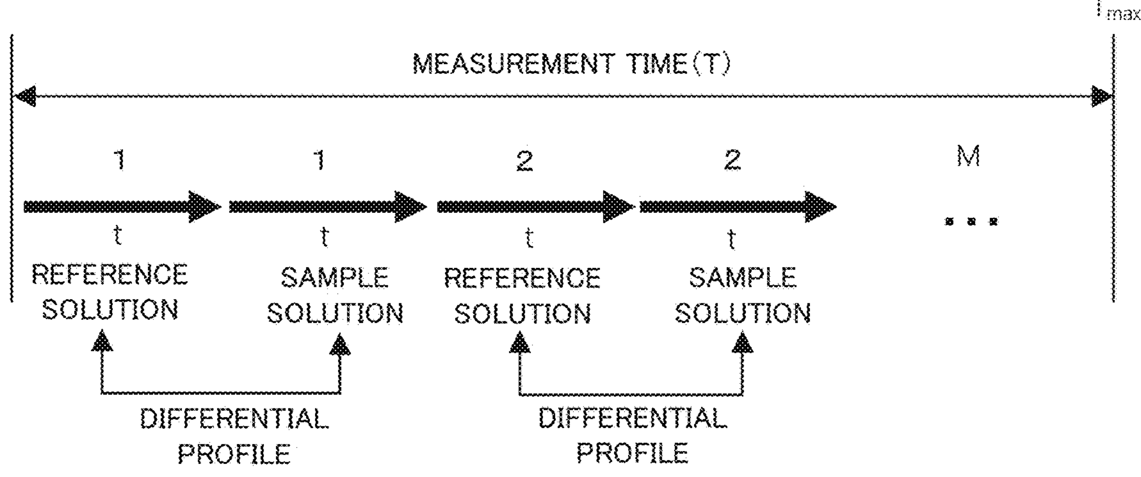
Figure 7C:
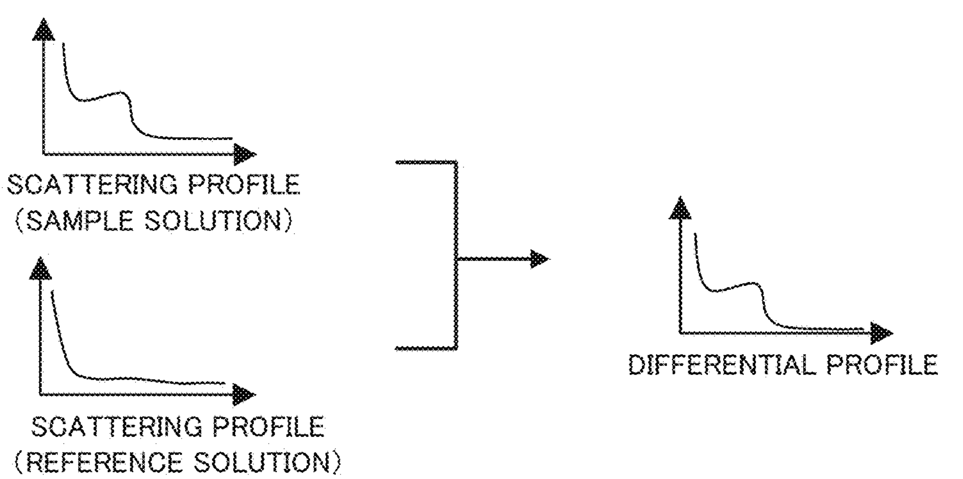

FIG. 7A to FIG. 7C are diagrams illustrating a q-direction profile for each acquisition of a scattered image, acquisition of measurement data at each time, and generating of a differential profile. As shown in FIGS. 7 (*a*) to (*c*), in the measurement, using the scattered image obtained for each of the reference solution and the sample solution at every predetermined time t, it is converted into a scattering profile showing the intensity to the wave number q (function of the scattering angle θ). Then, a differential profile is generated by subtracting successive scattering profiles from each other. The subtraction may be performed at the same scale value every time, for example, 1.0, or a predetermined fixed adjustment may be performed.

(Calculation of Index)

Figure 8:
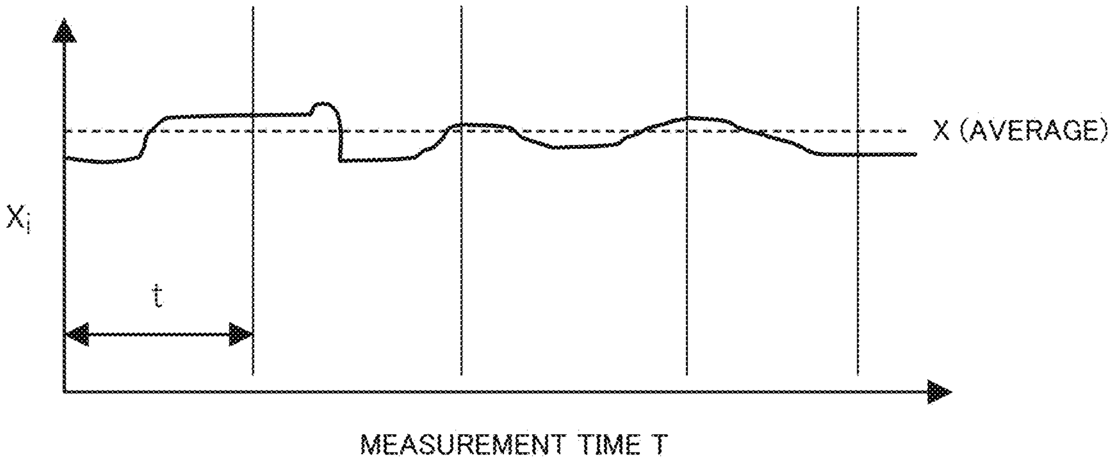
FIG. 8 is a graph showing the X-ray intensity at a predetermined wave number with respect to the measurement time.

When the obtained time-differential profiles are accumulated, the intensity Xi=II/σ at a predetermined wave number qi can be obtained. FIG. 8 is a graph showing the X-ray intensity at a predetermined wave number with respect to the measurement time. In this way, parameters can be extracted based on the measured data. Then, an index is calculated from this parameter, and it can be determined whether or not the measurement should be continued.

(Determined by Index)

FIG. 9 is a diagram illustrating a table of extracted parameters. As shown in FIG. 9, the first index can be calculated by extracting the wave number q, the intensity I and the standard deviation σ. The first index is an index indicating fluctuation of the intensity in the time axis direction and is, for example, σt(I/σ). σt(I/σ) can be calculated by the following formula (1). The parameters used for the first index are calculated using the parameters extracted from the initial measurement and the latest measurement.

$$\sigma_t(I/\sigma) = \sqrt{\frac{1}{n}\sum_{i=1}^{n}(x_i - \bar{x})^2}$$

It is determined whether or not σt(I/σ) calculated in this way is within a predetermined range. FIG. 10 is a graph showing a transition example of σt(I/σ). As shown in FIG. 10, σt(I/σ) of t up to t3 falls within the predetermined range, but σt(I/σ) of t4 falls outside the predetermined range. In such cases, the measurement is terminated at the time of t4 because it is unlikely that adequate analysis data will be obtained for structure analysis.

The second index is an index indicating a ratio of the intensity data to the fluctuation of the intensity in the scattering angle direction and is, for example, I/σ. The second index is an index corresponding to S/N ratio. The second index can be calculated by using the integrated profile obtained by integrating the differential profiles from the start of measurement to the present time. FIG. 11 is a graph showing a transition of I/σ. In the embodiment shown in FIG. 11, since I/σ is increasing until T=u4 and S/N is improved, it is determined that the measurement is continued. On the other hand, at T=u4, since I/σ is over a predetermined value, it is determined that enough measurement data for structure analysis has been acquired and the measurement is terminated.

(Generation of Analysis Data)

When sufficient measurement data is acquired, the control apparatus 200 generates analysis data. The analysis data is obtained by subtracting the intensity profile obtained by integrating the measurement data of the reference solution from the intensity profile obtained by integrating the measurement data of the sample solution over the entire measurement time.

In this case, the scales of the sample solution data and the reference solution data must be relatively adjusted and subtracted in order to appropriately process the wide-angle data used for the structure analysis of 30 Å or less.

When the relative scales of the sample solution data and the reference solution data are adjusted, for example, it is possible to perform the adjustment so that the average values of the sample solution data and the reference solution data coincide with each other in the range of the wide angle side of the wave number of the scattering vector. However, the range for adjustment is not necessarily limited to the above range and applicable as long as it is not affected by the scattering data by the sample. Thus, it is possible to generate accurate analysis data even in a wide angle range.

The obtained analysis data can be used for structural analysis as an X-ray scattering profile of actual measurement. The volume of the cube of the real space containing the particles is represented by the cubic voxels discretized into N×N×N grids, and the electron density map can be calculated by searching for the structure factor based on the measured X-ray scattering profile.

Specifically, a plurality of structural models is generated from the measured X-ray scattering profile, and a calculated X-ray scattering profile is derived from each of the plurality of structural models. An index representing the degree of coincidence between the calculated and measured X-ray scattering profiles is calculated, and a representative structural model is selected from the plurality of structural models based on the calculated index. Thus, it is possible to accurately reproduce the structural model of the macromolecule in the solution having the structure with dynamic movement.

Second Embodiment

In the above described embodiment, the first index and the second index are calculated using the differential profile, but one of the first index and the second index may be calculated using one of the profiles of the solution data. In this case, it is possible to first obtain a profile of the solution data using the reference solution to calculate and evaluate the first index and the second index, respectively, and to obtain a profile of the solution data using the sample solution to calculate and evaluate the first index and the second index, respectively.

Figure 12:
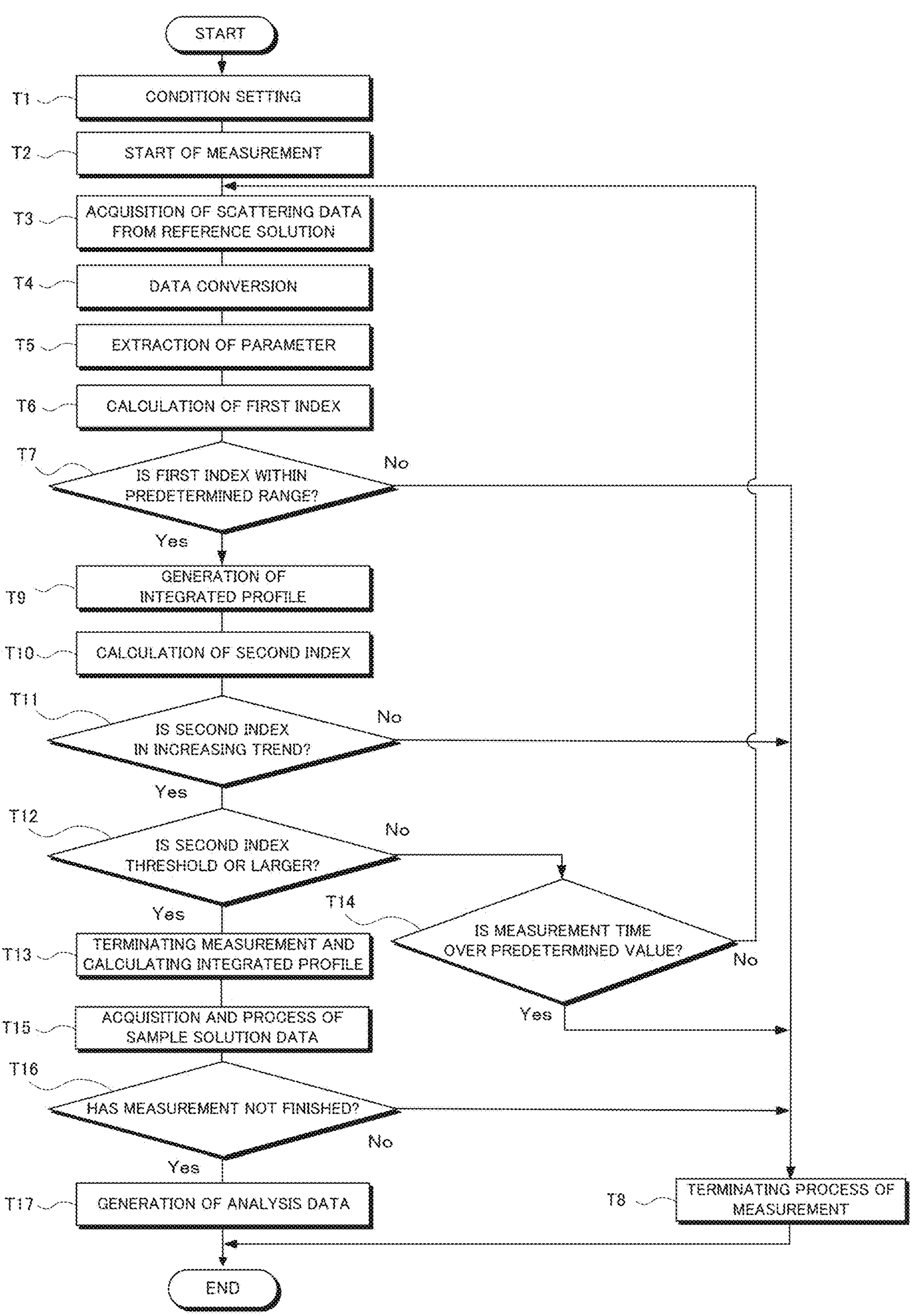
FIG. 12 is a flowchart showing an operation of the control apparatus of the second embodiment.

FIG. 12 is a flowchart showing an operation of the control apparatus 200. Unlike the example shown in FIG. 4, in the example shown in FIG. 12, the differential profile is not used for calculating each index. First, the X-ray analysis apparatus 100 sets the measurement conditions based on the information input from the user (step T1).

In response to the instruction to start the measurement by the user input, the X-ray analysis apparatus 100 starts the measurement (step T2). The X-ray analysis apparatus 100 delivers the reference solution to a predetermined position, irradiates the reference solution with X-rays, and acquires scattered data by the detector (step T3). The scattering data is treated as the measurement data in a unit of the scattered image data for every predetermined time t. The X-ray analysis apparatus transmits the acquired scattered image data as the measurement data to the computer 210. The computer 210 stores the received measurement data and converts the measurement data into the scatter profiles (step T4).

The computer 210 extracts parameters such as the wave number q, the intensity I and the standard-deviation σ of the intensity based on the obtained profile of the reference solution data (step T5). Then, σt(I/σ) is calculated as the first index representing the fluctuation of the intensity in the time axis direction (step T6). It is determined whether or not the calculated first index is within the predetermined range (step T7), and when the first index is not within the predetermined range, a process of terminating the measuring is performed (step T8).

On the other hand, when the first index is within the predetermined range, an integrated profile of the reference solution data is generated (step T9). The integrated profile is data obtained by integrating the profiles from the start of measurement to the present time.

By using the integrated profile of the scattering data of the reference solution thus generated, I/σ is calculated as a second index representing the ratio of the data of the intensity to the fluctuation of the intensity in the scattering angle direction (step T10). It is determined whether or not the second index is in an increasing trend (step T11), and if the second index is not in an increasing trend, the process proceeds to step T8, and a process of terminating the measurement is performed.

When the second index is in a increasing trend, it is determined whether or not the second index is a threshold value or larger (step T12). When the second index is the threshold value or larger, a process of terminating the measurement is performed, and an integrated profile of the reference solution data is calculated (step T13).

If the second index is not the threshold value or larger, it is determined whether or not the measurement time is over a predetermined value (step T14). If the measurement time is not over the predetermined value, the process returns to the step T3, and the measurement is continued. When the measurement time is over the predetermined value, the process proceeds to the step T8, and a process of terminating the measurement is performed.

Next, the sample solution is also subjected to measurement, data acquisition, and processing in the same manner as in steps T3 to T14 (step T15), and when the measurement is not terminated, the integrated profile of the sample solution data is calculated (step T16). Then, by subtracting the integrated profile of the reference solution data from the integrated profile of the sample solution data, the analysis data is generated (step T17). When the measurement is finished, the process proceeds to the step T8.

In calculating the first index and the second index, it is possible to start with the measurement using the reference solution and first use the profile of the reference solution data. When the biomacromolecule in the solution is irradiated with X-rays, damage is likely to occur. Such samples are also time consuming to be prepared and valuable. On the other hand, the reference solution is not very valuable, and it is possible to use a solution which does not deteriorate even if X-rays are irradiated. Efficient measurement is possible by calculating the first and second indices from sufficient reference solution data, obtaining an ideal profile, and then obtaining as much sample solution data as necessary.

When generating analysis data by subtracting the integrated profile of the reference solution data from the integrated profile of the sample solution data, it is required that the second indices of both are at the same level as described above. If the second indices are not equivalent, the quality of the generated analysis data is reduced to the quality of the lower one of the second indices.

VARIOUS EMBODIMENT

Including the above example, there are four methods for acquiring solution data, and an appropriate method can be selected depending on the situation.

(1) Method for simultaneously acquiring reference solution data and sample solution data (2) Method for acquiring sample solution data after acquiring reference solution data (3) Method of repeating acquiring reference solution data and acquiring sample solution data alternately (4) Method for acquiring reference solution data after acquiring sample solution data Among them, simultaneous acquisition is ideal. If the solution data are acquired at the same time, the differential profile of the measurement data can be calculated in a unit of every predetermined time t. In order to realize the simultaneous acquisition, a special device for acquiring data at the same time is required.

A method of acquiring the sample solution data after acquiring the reference solution data (second embodiment) is also possible. In this case, if there is an abnormality in the apparatus and so forth without damaging the sample, it is recognized, and the measurement can be terminated.

A method in which the acquisition of the reference solution data and the acquisition of the sample solution data are alternately repeated (first embodiment) is also effective. In this case, it is possible to calculate each index using the differential profile and determine whether or not to continue the measurement.

Example

Figure 13A:
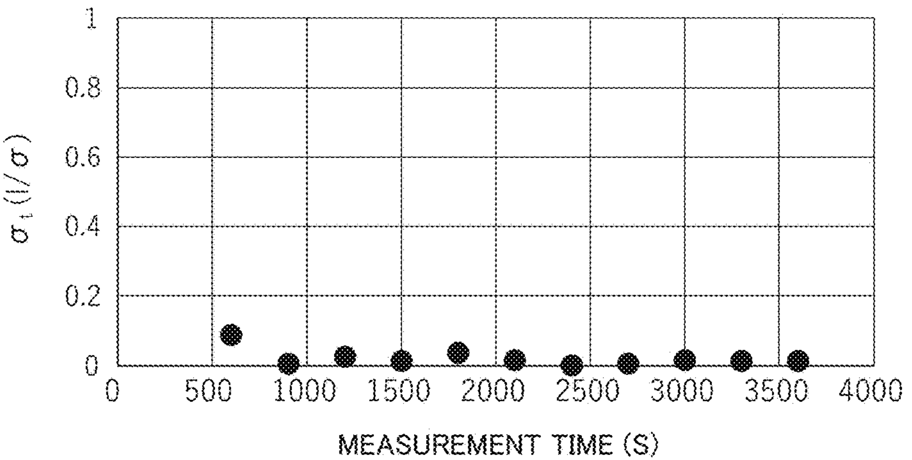
FIG. 13A, FIG. 13B, and FIG. 13C are respectively a graph plotting $\sigma t(I/\sigma)$ of an experiment, a graph plotting $I/\sigma$, and a schematic diagram showing a visualized structural model.
Figure 13B:
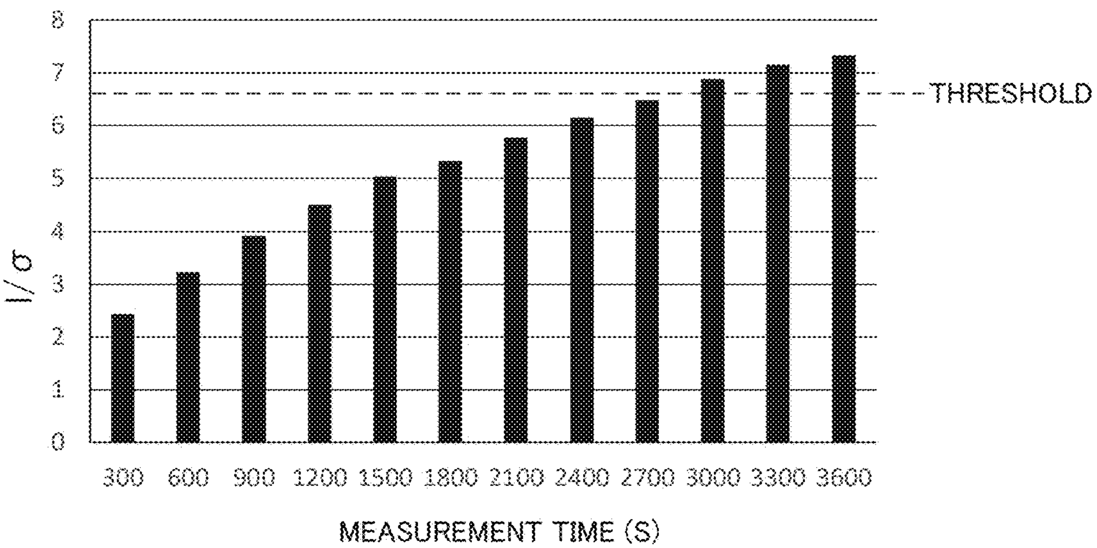
Figure 13C:
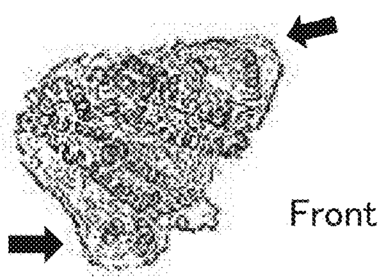
Figure 14:
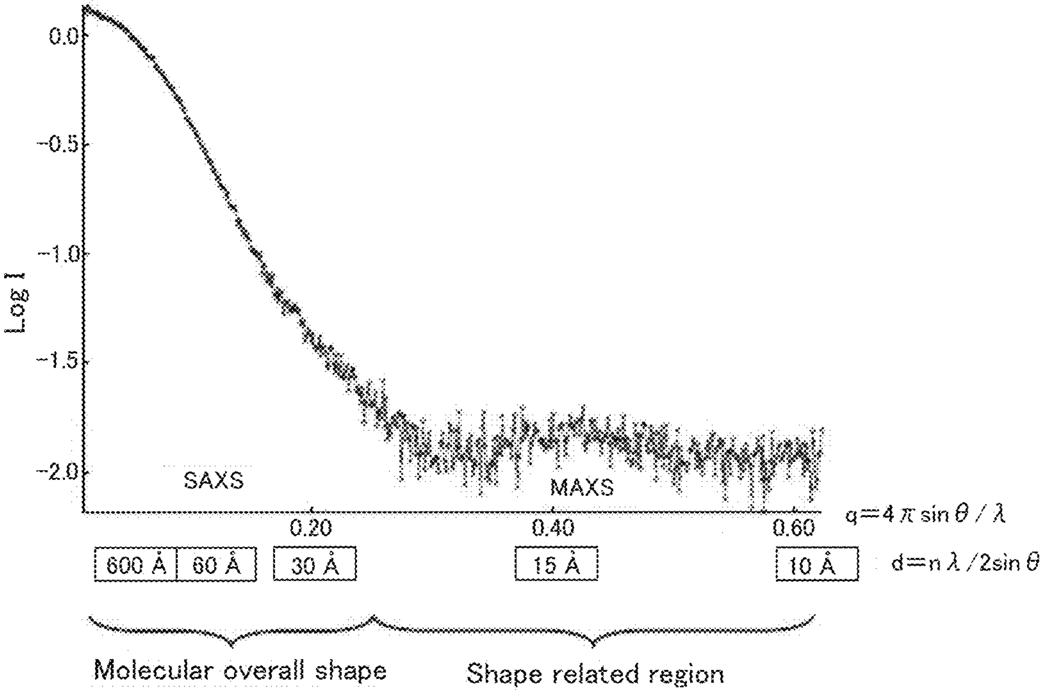
FIG. 14 is a diagram showing a correspondence relationship between an identifiable size and a scattering profile.

As an example, a sample of a biomacromolecule (Human Serum Albumin (HSA)) in a solution was used for the measurement. FIGS. 13A to 13C are respectively a graph plotting $\sigma t(I/\sigma)$ of an experiment, a graph plotting $I/\sigma$, and a schematic diagram showing a visualized structural model.

First, as shown in FIG. 13A, in the experiment, $\sigma t(I/\sigma)$ was calculated and plotted as the first index representing the fluctuation of the intensity in the time-axis direction. $\sigma t(I/\sigma)$ was included in the range of 0.0+0.1, and it showed almost constant value up to 3600 s. Then, as shown in FIG. 13B, $I/\sigma$ was calculated and plotted as the second index representing the ratio of the intensity data to the fluctuation of the intensity in the scattering angle direction in the experiment.

As shown in FIG. 13C, a structural model was generated based on the analysis data that passed the determination of the first index and the second index. The upper right and lower arrows of the structural model protrude from the protein body. It was confirmed that the α helix bundle involved in the binding with the compound was arranged in the protruding region. In addition, it was confirmed that significant data was obtained for specifying the structural of 30 Å or less of the macromolecule in the solution.

DESCRIPTION OF SYMBOLS

10 control system
100 X-ray analysis apparatus
110 X-ray generating section
111 X-ray source
115 optical system
117 Kratzky block
120 sample loading mechanism
125 sample holding tube
130 detector
140 control unit
200 control apparatus
210 computer
211 I/O controlling section
215 measurement controlling section
217 measurement data storing section
223 data converting section
225 differential profile generating section
255 measurement time determining section
268 apparatus controlling section
272 analysis data generating section
280 input device
290 output device
L control bus
S0 sample

What is claimed is:

1. A control apparatus for controlling an X-ray analysis apparatus, comprising:
processing circuitry configured to
convert sample solution data and reference solution data acquired from the X-ray analysis apparatus into profiles at each time,
calculate a first index representing fluctuation in intensity calculated from a relationship between time and the intensity based on at least a profile of solution data of the converted profiles,
determine whether or not the calculated first index is within a predetermined range, and
terminate measurement by the X-ray analysis apparatus when the first index is not within the predetermined range.

2. The control apparatus according to claim 1, wherein the processing circuitry is further configured to
calculate the first index with respect to a differential profile between a profile of the sample solution and a profile of the reference solution.

3. The control apparatus according to claim 1, wherein the processing circuitry is further configured to
calculate the first index with respect to a profile of the reference solution.

4. The control apparatus according to claim 1, wherein the processing circuitry is further configured to
calculate a second index indicating a ratio of the intensity data to the fluctuation of the intensity in the scattering angle direction based on an integrated profile of at least a solution data obtained from the converted profiles,
determine whether or not the calculated second index tends to increase, and
terminate the measurement by the X-ray analysis apparatus when the calculated second index does not tend to increase.

5. The control apparatus according to claim 4, wherein the processing circuitry is further configured to
calculate the second index with respect to a differential profile between a profile of the sample solution and a profile of the reference solution.

6. The control apparatus according to claim 4, wherein the processing circuitry is further configured to
calculate the second index with respect to a profile of the sample solution.

7. The control apparatus according to claim 4, wherein the processing circuitry is further configured to
determine whether or not the calculated second index is a threshold value or larger, and
terminate the measurement by the X-ray analysis apparatus when the calculated second index is a threshold value or larger.

8. The control apparatus according to claim 1, wherein the processing circuitry is further configured to
determine whether or not the measurement time is over a predetermined value, and terminate the measurement by the X-ray analysis apparatus when the measurement time is over the predetermined value.

9. The control apparatus according to claim 1, wherein the processing circuitry is further configured to adjust the scale so that the average values of the sample solution data and the reference solution data coincide with each other before the subtraction in the range on the wide angle side of the scattering vector.

10. The control apparatus according to claim 1, wherein the processing circuitry is further configured to output a plot of the calculated first index with respect to time to an output device during measurement.

11. The control apparatus according to claim 1, wherein the processing circuitry is further configured to output a plot of the calculated second index with respect to time to an output device during measurement.

12. A system for performing X-ray analysis, comprising:

an X-ray analysis apparatus for irradiating a sample with X-rays and detecting a scattered image, and the control apparatus according to claim 1 for controlling the X-ray analysis apparatus.

13. A method for controlling an X-ray analysis apparatus, comprising the steps of:

converting sample solution data and reference solution data acquired from an X-ray analysis apparatus into profiles at each time, calculating a first index representing fluctuation in intensity calculated from a relationship between time and the intensity based on at least a profile of solution data of the converted profiles, determining whether or not the calculated first index is within a predetermined range, and terminating measurement by the X-ray analysis apparatus in a case that the first index is not within the predetermined range.

14. A non-transitory computer readable recording medium having recorded thereon a program for controlling an X-ray analysis apparatus, the program causing a computer to execute the processes of:

converting sample solution data and reference solution data acquired from an X-ray analysis apparatus into profiles at each time, calculating a first index representing fluctuation in intensity calculated from a relationship between time and the intensity based on at least a profile of solution data of the converted profiles, determining whether or not the calculated first index is within a predetermined range, and terminating measurement by the X-ray analysis apparatus when the first index is not within the predetermined range.

* * * * *